(12) United States Patent
Chen et al.

(10) Patent No.: US 12,297,760 B2
(45) Date of Patent: May 13, 2025

(54) CATALYTIC SYSTEM COMPRISING ANTIMONY-CONTAINING CATALYST

(71) Applicant: BASF CORPORATION, Florham Park, NJ (US)

(72) Inventors: Liang Chen, Shanghai (CN); Jiadi Zhang, Shanghai (CN); Renjie Qiu, Shanghai (CN); Yuchao Zhang, Shanghai (CN); Yufen Hao, Shanghai (CN); Wenming Shi, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 18/694,217

(22) PCT Filed: Sep. 26, 2022

(86) PCT No.: PCT/CN2022/121247
§ 371 (c)(1),
(2) Date: Mar. 21, 2024

(87) PCT Pub. No.: WO2023/046146
PCT Pub. Date: Mar. 30, 2023

(65) Prior Publication Data
US 2024/0392715 A1 Nov. 28, 2024

(30) Foreign Application Priority Data

Sep. 27, 2021 (WO) ................. PCT/CN2021/121061

(51) Int. Cl.
| | | |
|---|---|---|
| F01N 3/28 | (2006.01) | |
| B01D 53/94 | (2006.01) | |
| B01J 23/22 | (2006.01) | |
| B01J 23/42 | (2006.01) | |
| B01J 29/76 | (2006.01) | |
| B01J 35/00 | (2006.01) | |
| B01J 35/57 | (2024.01) | |
| B01J 37/02 | (2006.01) | |
| B01J 37/04 | (2006.01) | |
| B01J 37/08 | (2006.01) | |
| F01N 3/10 | (2006.01) | |
| F01N 3/20 | (2006.01) | |

(52) U.S. Cl.
CPC ....... *F01N 3/2828* (2013.01); *B01D 53/9418* (2013.01); *B01J 23/22* (2013.01); *B01J 23/42* (2013.01); *B01J 29/7615* (2013.01); *B01J 29/763* (2013.01); *B01J 35/19* (2024.01); *B01J 35/57* (2024.01); *B01J 37/0215* (2013.01); *B01J 37/0236* (2013.01); *B01J 37/0248* (2013.01); *B01J 37/04* (2013.01); *B01J 37/08* (2013.01); *F01N 3/101* (2013.01); *F01N 3/2066* (2013.01); *B01D 2255/1021* (2013.01); *B01D 2255/20707* (2013.01); *B01D 2255/20723* (2013.01); *B01D 2255/20738* (2013.01); *B01D 2255/20761* (2013.01); *B01D 2255/2098* (2013.01); *B01D 2255/502* (2013.01); *B01D 2255/9022* (2013.01); *B01D 2255/903* (2013.01); *B01D 2255/9155* (2013.01); *B01D 2257/404* (2013.01); *B01D 2258/012* (2013.01); *F01N 2370/04* (2013.01)

(58) Field of Classification Search
CPC ........ B01D 53/9418; B01D 2255/1021; B01D 2255/20707; B01D 2255/20723; B01D 2255/20761; B01D 2255/2098; B01D 2255/502; B01D 2255/9022; B01D 2255/903; B01D 2255/9155; B01D 2257/404; B01D 2258/012; B01J 23/22; B01J 23/42; B01J 29/7615; B01J 29/763; B01J 35/19; B01J 35/57; B01J 37/0215; B01J 37/0236; B01J 37/0248; B01J 37/04; B01J 37/08; F01N 3/101; F01N 3/2066; F01N 3/2828; F01N 2370/04
USPC ......................................................... 60/299
See application file for complete search history.

(56) References Cited

U.S. PATENT DOCUMENTS

| | | | |
|---|---|---|---|
| 8,975,206 B2 | 3/2015 | Schermanz et al. | |
| 2008/0053071 A1 | 3/2008 | Adams et al. | |
| 2009/0143225 A1 | 6/2009 | Ha et al. | |
| 2019/0232264 A1* | 8/2019 | Duisberg | ................. B01J 23/44 |

FOREIGN PATENT DOCUMENTS

| | | | | |
|---|---|---|---|---|
| CN | 102869862 A | | 1/2013 | |
| JP | 2010013969 A | | 1/2010 | |
| JP | 2011152496 A | | 8/2011 | |
| KR | 101065242 B1 | | 9/2011 | |
| WO | 2017101449 A1 | | 6/2017 | |
| WO | 2019096785 A1 | | 5/2019 | |
| WO | WO-2021055299 A1 * | 3/2021 | ......... B01D 53/8628 |

* cited by examiner

*Primary Examiner* — Jorge L Leon, Jr.
(74) *Attorney, Agent, or Firm* — DLA Piper LLP (US)

(57) ABSTRACT

A catalyst system for purifying an exhaust gas, comprising one or more antimony-containing regions comprising an antimony-containing catalyst, particularly antimony-containing SCR catalyst, and one or more antimony-trapping regions comprising a molecular sieve which is optionally metal-promoted, wherein at least one of the antimony-trapping regions is located downstream of the one or more antimony-containing regions in a flow direction of the exhaust gas, and also a method for treatment of an exhaust gas containing nitrogen oxides.

20 Claims, No Drawings

CATALYTIC SYSTEM COMPRISING ANTIMONY-CONTAINING CATALYST

FIELD OF THE INVENTION

The present invention relates to a catalytic system comprising an antimony-containing catalyst and a method for treatment of an exhaust gas containing nitrogen oxides.

BACKGROUND

Antimony-containing catalysts are known useful in many fields, for example in production of polyester materials, ammoxidation of alkanes and alkenes, alkoxylation of organic compounds, treatment of engine exhausts. Antimony species may function as either actives or promoters, and may have different chemical compositions depending on particular applications. In recent decades, concerns over the volatility of antimony species at high temperatures became an issue limiting the available market of antimony-containing catalysts in certain applications, for example in engine exhaust treatment.

Engine exhausts, in particular, diesel engine exhausts, comprise gaseous emissions such as carbon monoxide (CO), unburned hydrocarbons (HC) and nitrogen oxides (NOx), and condensed phase materials (liquids and solids) which are commonly referred to as particulates or particulate matter (PM). The engine exhausts need to be treated with an engine exhaust system before emission to air. The engine exhaust system generally comprises a catalyst for reduction of NOx, for example a catalyst for reduction of NOx by selective catalytic reduction (SCR).

Antimony species have been reported as a good candidate for effectively improving the SCR performance of vanadium-based oxide SCR catalysts. US 2009/143225A1 describes a SCR catalyst comprising vanadium oxide as an active material and antimony, and proved antimony is effective for promoting reduction of nitrogen oxides (NOx) at low temperatures and increasing sulfur poisoning resistance. Vanadium-based oxide SCR catalysts containing antimony species were also described for example in KR101065242B1, U.S. Pat. No. 8,975,206B2 and WO2017101449A1.

Despite of the good promoting effect of antimony on vanadium-based oxide SCR catalysts, application of vanadium-based oxide SCR catalysts containing antimony species in engine exhaust systems are limited for the concern of the volatility of antimony species at high temperatures that may be encountered by SCR catalysts in a stream of hot exhaust gases. Some measures useful for abating antimony evaporation from SCR catalysts were proposed. For example, WO2021055299A1 describes a vanadium-based oxide catalyst containing antimony species and proved the presence of tungsten species in the catalyst can significantly suppress the evaporation of antimony species under high temperature.

It will be desirable if an alternative or more effective approach for abating the release of antimony from antimony-containing catalysts into ambient.

SUMMARY OF THE INVENTION

It is an object of the present invention to provide a catalytic system comprising an antimony-containing catalyst, which will generate antimony release into ambient in a desirably low amount.

Surprisingly, the object was achieved by a catalyst system which comprises one or more antimony-containing regions and one or more regions comprising a molecular sieve for trapping antimony.

Accordingly, in one aspect, the present invention relates to a catalyst system for purifying an exhaust gas, comprising
one or more antimony-containing regions comprising an antimony-containing catalyst, particularly antimony-containing SCR catalyst, and
one or more antimony-trapping regions comprising a molecular sieve which is optionally metal-promoted;
wherein at least one of the antimony-trapping regions is located downstream of the one or more antimony-containing regions in a flow direction of the exhaust gas.

In another aspect, the present invention relates to a method for treatment of an exhaust gas containing nitrogen oxides, which comprises contacting the exhaust gas with the catalytic system as described herein in the presence of a reductant.

In a further aspect, the present invention relates to a system for treatment of an exhaust gas, especially originating from an internal combustion engine, which comprises a reductant source, the catalytic system as described herein, and optionally one or more of diesel oxidation catalyst (DOC), three-way conversion catalyst (TWC), four-way conversion catalyst (FWC), non-catalyzed or catalyzed soot filter (CSF), ammonia oxidation catalyst (AMOx), NOx trap, NOx absorber catalyst, hydrocarbon trap catalyst, sensor and mixer.

It has been found by the inventors that the antimony release from the antimony-containing catalyst into ambient can be effectively suppressed by arranging a downstream antimony-trapping region comprising a molecular sieve.

DETAILED DESCRIPTION OF THE INVENTION

The present invention will be described in detail hereinafter. It is to be understood that the present invention may be embodied in many different ways and shall not be construed as limited to the embodiments set forth herein.

Herein, the singular forms "a", "an" and "the" include plural referents unless the context clearly dictates otherwise. The terms "comprise", "comprising", etc. are used interchangeably with "contain", "containing", etc. and are to be interpreted in a non-limiting, open manner. That is, e.g., further components or elements may be present. The expressions "consists of" or "consists essentially of" or cognates may be embraced within "comprises" or cognates.

The term "region" as used herein is just intended to mean part of the catalyst system which comprises specified materials and extends a certain length in the exhaust gas flow direction.

Herein, any reference to "upstream" and "downstream" will be understood to be relative positions with respect to a stream flow direction, for example flow direction of an exhaust gas.

According to the first aspect, the present invention provides a catalyst system for purifying an exhaust gas, comprising:
one or more antimony-containing regions comprising an antimony-containing catalyst, and
one or more antimony-trapping regions comprising a molecular sieve which is optionally metal-promoted;
wherein at least one of the antimony-trapping regions is located downstream of the one or more antimony-containing regions in a flow direction of the exhaust gas.

The antimony-containing regions may comprise any antimony-containing catalyst useful for purifying an exhaust gas. Particularly the antimony-containing regions comprise an antimony-containing SCR catalyst.

The antimony-containing catalyst may be those vanadium-based SCR catalysts containing an antimony promoter. Accordingly, the antimony-containing catalyst contains vanadium as a main active species for selective catalytic reduction of NOx, and antimony as a promoter, each being present typically in form of respective oxides and/or composite oxide thereof.

The antimony-containing catalyst may optionally comprise at least one additional metal or metalloid. The additional metal or metalloid may include but are not limited to boron (B), aluminum (Al), bismuth (Bi), silicon (Si), tin (Sn), lead (Pb), chromium (Cr), manganese (Mn), iron (Fe), cobalt (Co), nickel (Ni), copper (Cu), zinc (Zn), gallium (Ga), cerium (Ce), yttrium (Y), niobium (Nb), molybdenum (Mo), barium (Ba), samarium (Sm), erbium (Er) and tungsten (W). Particularly, the additional metal or metalloid may be selected from silicon (Si), molybdenum (Mo) and tungsten (W). It will be understood that the at least one metal or metalloid may be present in form of respective oxides, or a composite oxide thereof with vanadium, antimony or other additional metal or metalloid, or a combination thereof.

In some embodiments, the antimony-containing catalyst contains or consists of an antimony oxide, a vanadium oxide and optionally at least one oxide of metal or metalloid selected from silicon (Si), molybdenum (Mo) and tungsten (W), on particles of a support. For example, the antimony-containing catalyst contains or consists of oxides of vanadium (V), antimony (Sb) and silicon (Si) on particles of a support.

Useful materials as the support may include, but are not limited to molecular sieves and oxides of a metal selected from the group consisting of Ti, Si, W, Al, Ce, Zr, Mg, Ca, Ba, Y, La, Pr, Nb, Mo, Mn, Fe, Co, Ni, Cu, Zn, Ga, Sn and Bi. Preferably, the support may be one or more selected from titania (preferably anatase), silica, alumina, zirconia, and any dopant-stabilized forms thereof.

The antimony-containing catalyst may contain antimony, calculated as $Sb_2O_3$, in an amount of 1 to 30% by weight, 1 to 25% by weight, 1 to 15% by weight, 2 to 12% by weight or 2 to 8% by weight, based on the total weight of the antimony-containing catalyst.

The antimony-containing catalyst may contain vanadium, calculated as $V_2O_5$, in an amount of 0.1 to 20% by weight, 1 to 15% by weight, 2 to 10% by weight, or 2 to 7% by weight, based on the total weight of the antimony-containing catalyst.

Each of the at least one additional metal or metalloid, when present, may be contained in the antimony-containing catalyst in an amount of 0.1 to 30% by weight, 1 to 15% by weight, or 2 to 10% by weight, calculated as respective oxides, based on the total weight of the antimony-containing catalyst.

The support may be contained in the antimony-containing catalyst in an amount of at least 40% by weight, at least 50% by weight, at least 65% by weight, at least 70% by weight or at least 75% by weight, based on the total weight of the antimony-containing catalyst. The amount of the support may be up to 95% by weight or up to 90% by weight, based on the total weight of the antimony-containing catalyst.

In some illustrative embodiments, the antimony-containing catalyst contains or consists of
(a) 1 to 25% by weight of an antimony oxide, calculated as $Sb_2O_3$,
(b) 1 to 15% by weight of a vanadium oxide, calculated as $V_2O_5$,
(c) 1 to 15% by weight of $SiO_2$,
(d) optionally 1 to 10% by weight of a tungsten oxide, calculated as $WO_3$, and
(e) 65 to 95% by weight of $TiO_2$ support,
each being based on the total weight of the antimony-containing catalyst.

In some illustrative embodiments, the antimony-containing catalyst contains or consists of
(a) 1 to 15% by weight of an antimony oxide, calculated as $Sb_2O_3$,
(b) 2 to 10% by weight of a vanadium oxide, calculated as $V_2O_5$,
(c) 2 to 10% by weight of $SiO_2$,
(d) optionally, 2 to 10% by weight of a tungsten oxide, calculated as $WO_3$, and
(e) 70 to 90% by weight of $TiO_2$ support,
each being based on the total weight of the antimony-containing catalyst.

In some further illustrative embodiments, the antimony-containing catalyst contains or consists of
(a) 2 to 12% by weight, preferably 2 to 8% by weight of an antimony oxide, calculated as $Sb_2O_3$,
(b) 2 to 7% by weight of a vanadium oxide, calculated as $V_2O_5$,
(c) 2 to 10% by weight of $SiO_2$, and
(e) 75 to 90% by weight of $TiO_2$ support,
each being based on the total weight of the antimony-containing catalyst.

The total weight of the antimony-containing catalyst in each case as described herein will be 100% by weight.

It will be understood that the antimony-containing catalyst in each of the antimony-containing regions, if two or more such regions are present, may have same or different composition from another.

The antimony-containing catalyst may be present in an amount providing 50 to 3,000 $g/ft^3$ of antimony, preferably 200 to 2,200 $g/ft^3$ of antimony, more preferably 350 to 2,000 $g/ft^3$ of antimony, calculated as $Sb_2O_3$, based on each antimony-containing region.

The antimony-containing regions may also contain one or more components in addition to the antimony-containing catalyst, which may be non-catalytically active components, for example processing aids useful in the preparation of catalytic articles, such as lubricants and binders. The other components may also be catalytically active, for example active species other than the antimony-containing catalyst.

It has been surprisingly found by the inventors that molecular sieves are useful for trapping antimony species. Therefore, one or more regions comprising a molecular sieve are arranged in the catalytic system for trapping antimony. Those regions are referred to as antimony-trapping regions herein.

The antimony-trapping regions comprise a molecular sieve which is optionally metal-promoted. Herein, the term "metal-promoted" within the context of the molecular sieve is intended to mean a metal capable of improving any performance of the molecular sieve has been incorporated into and/or onto the molecular sieve. The metal, also referred to as a promoter metal, is present in the molecular sieve as a non-framework element. In other words, the promoter metal does not participate in constituting the molecular sieve framework. The promoter metal may reside within the molecular sieve and/or on at least a portion of the molecular sieve surface, preferably in form of ionic species.

Molecular sieves refer to framework materials based on an extensive three-dimensional network of oxygen ions containing generally tetrahedral type sites and having a substantially uniform pore distribution. Suitable molecular sieves for the purpose of the present invention may be microporous or mesoporous. Typically, molecular sieves having an average pore size of less than 2 nm is classed as "microporous", and molecular sieves having an average pore size of 2 to 50 nm is classed as "mesoporous". The pore sizes are defined by the ring size.

Particularly, the molecular sieve is zeolite. The term "zeolite" has its usual meaning in the art and typically refers to a crystalline material (typically aluminosilicate) having a spatial network structure with open 3-dimensional framework structures composed of corner-sharing $TO_4$ tetrahedra, where T is tetravalent element (typically Si) or trivalent element (typically Al). Cations that balance the charge of the anionic framework are loosely associated with the framework oxygens, and the remaining pore volume is filled with water molecules. The non-framework cations are generally exchangeable, and the water molecules removable.

For the purpose of the present invention, suitable molecular sieves may include, but are not limited to aluminosilicate zeolites having a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG and ZON, and any combinations thereof.

Particularly, the molecular sieves useful for the antimony-trapping regions include zeolites having a framework type selected from the group AEI, AEL, AFI, AFT, AFO, AFX, AFR, ATO, BEA, CHA, DDR, EAB, EMT, ERI, EUO, FAU, FER, GME, HEU, JSR, KFI, LEV, LTA, LTL, LTN, MAZ, MEL, MFI, MOR, MOZ, MSO, MTW, MWW, OFF, RTH, SAS, SAT, SAV, SBS, SBT, SFW, SSF, SZR, TON, TSC and WEN.

In some embodiments, the molecular sieves useful for the antimony-trapping regions include zeolites having a framework type selected from the group AEI, BEA (e.g. beta), CHA (e.g. chabazite, SSZ-13), AFT, AFX, FAU (e.g. zeolite Y), MOR, MFI (e.g. ZSM-5), MOR (e.g. mordenite) and MEL, among which AEI, BEA and CHA are particularly preferred.

In some other embodiments, the molecular sieves useful for the antimony-trapping regions may be selected from small pore zeolites. The term "small pore zeolites" refers to zeolites having pore openings which are smaller than about 5 Angstroms (Å). The small pore zeolites may be small pore 8-ring zeolites. The term "8-ring zeolite" refers to a zeolite having 8-ring pore openings. Some 8-ring zeolites may have double-six ring (d6r) secondary building units in which a cage like structure is formed resulting from the connection of double six-ring building units by 4-rings. Exemplary small pore 8-ring zeolites include framework types AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC and WEN.

In some particular embodiments, the small pore zeolites useful for the antimony-trapping regions include zeolites having a framework type selected from the group consisting of AEI, AFT, AFX, CHA, EAB, ERI, KFI, LEV, SAS, SAT and SAV. The small pore zeolites having a framework type selected from the group consisting of AEI, AFT, AFX and CHA may be particularly mentioned.

It will be appreciated that when a zeolite is mentioned by reference to the framework type code as generally accepted by the International Zeolite Association (IZA) herein, it is intended to include not only the reference material but also any isotypic framework materials having SCR catalytic activities. The list of reference material and the isotypic framework materials for each framework type code are available from the database of IZA (http://www.iza-structure.org/databases/).

The aluminosilicate zeolites useful as the molecular sieve in the antimony-trapping regions, for example those having any of the framework types as described hereinabove, suitably have a $SiO_2/Al_2O_3$ molar ratio (SAR) in the range of 5:1 to 150:1, preferably 5:1 to 50:1, and particularly 10:1 to 40:1.

The molecular sieves may exhibit a high surface area, for example a BET surface area, of at least 300 $m^2/g$, at least 400 $m^2/g$, at least 550 $m^2/g$ or at least 650 $m^2/g$, for example 400 to 750 $m^2/g$ or 450 to 750 $m^2/g$, as determined according to DIN 66131.

In some embodiments, the molecular sieve in the antimony-trapping regions is selected from metal-promoted molecular sieves. The promoter metal may be selected from precious metals such as Au and Ag, platinum group metals such as Ru, Rh, Pd, In and Pt, base metals such as Cr, Zr, Nb, Mo, Fe, Mn, W, V, Al, Ti, Co, Ni, Cu, Zn, Sb, Sn and Bi, alkali earth metals such as Ca and Mg, and any combinations thereof. The promoter metal is preferably Fe or Cu or a combination thereof.

In some illustrative embodiments, the antimony-trapping regions may comprise Cu and/or Fe promoted zeolite having the framework type of AEI, BEA, CHA, AFT, AFX, FAU, FER, KFI, MOR, MFI, MOR or MEL, particularly Cu and/or Fe promoted zeolite having the framework of AEI, BEA or CHA.

The promoter metal may be present in the metal-promoted molecular sieve in an amount of 0.1 to 20% by weight, 0.5 to 15% by weight, 1 to 10% by weight or 4 to 10% by weight on an oxide basis, based on the total weight of metal-promoted molecular sieve. In some illustrative embodiments wherein Cu or Fe is used as the promoter metal, the promoter metal is preferably present in an amount of 0.5 to 15% by weight, or 1 to 15% by weight, or 1 to 10% by weight, on an oxide basis, based on the total weight of the metal-promoted molecular sieve.

The antimony-trapping regions each may comprise one or more metal-promoted molecular sieves. In other words, just one metal-promoted molecular sieve or a combination of two or more metal-promoted molecular sieves may be used in a single antimony-trapping region.

The molecular sieve(s) may be present in an amount of 2,500 to 6,500 g/ft$^3$, preferably 3,000 to 5,500 g/ft$^3$, based on each antimony-trapping region. It is to be understood that the amount of the molecular sieve refers to the amount of metal-promoted molecular sieve in case that the latter is used.

Optionally, the antimony-trapping regions may comprise one or more functional components, for example a precious metal based catalyst useful for treating exhaust gas.

In some embodiments, at least one of the antimony-trapping regions comprises a precious metal based catalyst. Accordingly, such region comprises a first component of the molecular sieve which is optionally metal-promoted and a second component of the precious metal based catalyst.

The precious metal based catalyst may contain one or more precious metals supported on particles of a support. Suitable precious metals are particularly platinum group metals such as Ru, Rh, Pd, In and Pt, preferably Pt and Pd.

The support for the precious metal may be any materials suitable for receiving and carrying precious metals, for example molecular sieves, oxides of a metal selected from the group consisting of Ti, Si, W, Al, Ce, Zr, Mg, Ca, Ba, Y, La, Pr, Nb, Mo, Mn, Fe, Co, Ni, Cu, Zn, Ga, Sn, Sm, Eu, Hf, and Bi. Particularly, the support for the precious metal may be selected from high surface area alumina, ceria, zirconia, lanthana, baria, yttria, neodymia, praseodymia, titania, europia, samaria, hafnia, and any composite or combination thereof.

Each of the one or more precious metals may be present in an amount of 0.01 to 20 g/ft$^3$, preferably 0.5 to 10 g/ft$^3$, based on each antimony-trapping region.

The first component of the molecular sieve which is optionally metal-promoted and the second component of the precious metal based catalyst may be present in the antimony-trapping region in any possible forms, for example as a mixture thereof, or in separate forms. Alternatively, the first component and the second component may be integrated, for example by supporting the precious metal on the molecular sieve which is optionally metal-promoted.

In some embodiments, at least one of the antimony-trapping regions is layered, with a layer comprising the molecular sieve and a layer comprising the precious group metal based catalyst. There is no particular restriction to the arrangement of those layers. The layer comprising the molecular sieve may be arranged on top of the layer comprising the precious group metal based catalyst, and vice versa.

The antimony-trapping regions may comprise at least one additional component, which may be catalytically active or non-active, such as processing aids.

The one or more antimony-containing regions and the one or more antimony-trapping regions may, independently from each other, be present in the catalytic system according to the present invention in form of extrudates or in form of washcoats on substrate.

The term "extrudate" generally refers to shaped bodies formed by extrusion. The extrudate may have any suitable structures allowing gases flow through, preferably honeycomb structure. The honeycomb structure may have flow passages as described for the monolithic flow-through and wall-flow structures hereinbelow. When any of the regions is present in form of an extrudate, the extrudate may be formed from respective catalyst and optionally at least one processing aids such as binders and lubricants, by any conventional means.

The term "substrate" generally refers to a structure that is suitable for withstanding conditions encountered in exhaust streams, on which a catalytic material is carried, typically in the form of a washcoat.

Typically, the substrate may be a monolithic flow-through structure, which has a plurality of fine, parallel gas flow passages extending from an inlet to an outlet face of the substrate such that passages are open to fluid flow therethrough. The passages, which are essentially straight paths from their fluid inlet to their fluid outlet, are defined by walls on which the catalytic material is applied as washcoats so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain 60 to 900 or more flow passages (or "cells") per square inch of cross section. For example, the substrate may have 50 to 600 cells per square inch ("cpsi") or 200 to 450 cpsi. The wall thickness of flow-through substrates may vary, with a typical range from 2 mils to 0.1 inches.

The substrate may also a monolithic wall-flow structure having a plurality of fine, parallel gas flow passages extending along from an inlet to an outlet face of the substrate wherein alternate passages are blocked at opposite ends. The passages are defined by walls on which the catalytic material is applied as washcoats so that the gases flowing through the passages contact the catalytic material. The configuration requires the gases flow through the porous walls of the wall-flow substrate to reach the outlet face. The wall-flow substrates may have up to 700 cpsi, for example 100 to 400 cpsi. The flow passages of the monolithic substrate are thin-walled channels, which can be of any suitable cross-sectional shape and size such as trapezoidal, rectangular, square, sinusoidal, hexagonal, oval, circular, etc. The wall thickness of wall-flow substrates may vary, with a typical range from 2 mils to 0.1 inches.

The term "washcoat" has its usual meaning in the art and refers to a thin, adherent coating of a catalytic or other material applied to a substrate. A washcoat is generally formed by preparing a slurry containing the desired material and optionally processing aids such as binder with a certain solid content (e.g., 15 to 60% by weight) and then applying the slurry onto a substrate, dried and calcined to provide a washcoat layer. The washcoat, in form of one or more layers, is generally loaded on the substrate in an amount of 0.1 to 10 g/in$^3$, for example 0.5 to 7 g/in$^3$.

The substrate is usually inert and conventionally made of, for example, ceramic or metal materials, which will be referred to as "inert substrate" herein. It can be contemplated that the substrate may alternatively be active. In that case the substrate may consist of, for example, extrudate containing molecular sieve catalyst or other catalytically active species.

In some illustrative embodiments of the catalytic system according to the present invention, the one or more antimony-containing regions and the one or more antimony-trapping regions are present as washcoats on one or more pieces of inert substrate. Particularly, at least one of the antimony-containing regions and the at least one of the antimony-trapping regions are carried on two or more pieces of inert substrate separately.

In some particular illustrative embodiments, the catalytic system according to the present invention comprises one antimony-containing region and one antimony-trapping region, which are carried on one or two pieces of substrate as washcoats. In case of one piece of substrate, the washcoat of the antimony-containing region is located upstream of the washcoat of the antimony-trapping region. In case of two pieces of substrates, the antimony-containing region is carried as a washcoat on the first upstream substrate and the antimony-trapping region is carried as a washcoat on the second downstream substrate.

In some other particular illustrative embodiments, the catalytic system according to the present invention comprises two antimony-containing regions and one antimony-trapping region, which are carried on one, two or three pieces of substrate as washcoats. In case of one piece of substrate, the washcoats of the two antimony-containing regions are located upstream of the washcoat of the antimony-trapping region. In case of two pieces of substrates, the washcoats of the two antimony-containing regions may be carried on the first piece of upstream substrate in sequence and the antimony-trapping region is carried as a washcoat on the second piece of downstream substrate. Alternatively, one antimony-containing region may be carried as a washcoat on the first piece of upstream substrate, and the other antimony-containing region and the antimony-trapping region are carried as respective washcoats on the second piece of downstream substrate, wherein the antimony-trapping region is located downstream of the antimony-containing region on the second piece of downstream substrate. In case of three pieces of substrates, one antimony-containing region is carried on the first piece of upstream substrate, the other antimony-containing region is carried on the second piece of intermediate substrate and the antimony-trapping region is carried on the third piece of downstream substrate.

In some further particular illustrative embodiments, the catalytic system according to the present invention comprises one antimony-containing region and two antimony-trapping regions, which are carried on one, two or three pieces of substrate as washcoats. In case of one piece of substrate, the washcoat of one antimony-trapping region is located downstream of both of the washcoat of the antimony-containing region and the washcoat of the other antimony-trapping region, which latter two regions may be arranged in the said sequence or reversely. In case of two pieces of substrates, it can be contemplated that any two of the three regions may be carried on one piece of substrate as respective washcoats and the remaining region is carried on the other piece of substrate, provided that one antimony-trapping region is located most downstream. In case of three pieces of substrates, for example, the antimony-containing region is carried on the first piece of upstream substrate, one antimony-trapping region is carried on the second piece of intermediate substrate and the other antimony-trapping region is carried on the third piece of downstream substrate.

Suitable designs for the catalytic system according to the present invention comprising more regions may be contemplated with reference to the configurations as described above.

In other illustrative embodiments of the catalytic system according to the present invention, the one or more antimony-containing regions are present as an extrudates and the one or more antimony-trapping regions are present as washcoats carried on one or more pieces of substrate. The extrudates of antimony-containing regions and the substrates carrying the antimony-trapping regions may be arranged in any sequence in the flow direction of the exhaust gas, provided that at least one antimony-trapping region is located most downstream.

The catalytic system according to the present invention may comprise at least one housing for accommodating the one or more antimony-trapping regions and the one or more antimony-trapping regions. It will be understood that one housing may accommodate just one region, or may accommodate two or more regions.

Preferably, the catalytic system according to the present invention comprises just one housing for accommodating all regions or comprises two or more housings which are fluid communicated with each other. The housing preferably has a uniform geometry, for example in form of cylinder. In case of two or more housings, the housings preferably have same geometry, particular in form of cylinder.

Each of the one or more antimony-containing regions is comprised in the catalytic system in a proportion of 10 to 90% by volume, preferably 20 to 80% by volume, more preferably 30 to 70% by volume relative to the total volume of the antimony-containing regions and the antimony-trapping regions.

Each of the one or more antimony-trapping regions is comprised in the catalytic system in a proportion of 10 to 90% by volume, preferably 20 to 80% by volume, more preferably 30 to 70% by volume relative to the total volume of the antimony-containing regions and the antimony-trapping regions.

The proportion by volume as mentioned for a region refers to the spatial volume the region occupies. It will be appreciated that if a region is present as a washcoat on a substrate, the proportion by volume of the region is intended to refer to the volume of the part of the substrate on which the region is located.

The catalytic article according to the present invention may comprise one or more components or regions which could provide further functions, including but being not limited to oxidation function and storage function. It can be contemplated that a storage component such as hydrocarbon adsorber and NOx adsorber may be arranged in the area of the antimony-containing region. The one or more further components may be present in any forms, for example washcoat or co-extrudate. It can also be contemplated that there may be an intermediate region providing further functions between the antimony-containing region and the antimony-trapping region.

The catalytic system according to the present invention may be used to treat exhaust gases from for example stationary combustion devices such as power plants and heating systems for buildings and private households, and mobile combustion devices such as combustion engines of vehicles, especially diesel engines. The catalytic system according to the present invention may particularly effective to treat exhaust gases from internal combustion engines, for example gasoline or diesel engines, especially heavy-duty diesel engines.

Accordingly, in another aspect, the present invention relates to a method for treatment of an exhaust gas containing nitrogen oxides, which comprises contacting the exhaust gas with the catalytic system as described herein in the presence of a reductant.

In some embodiments, the method is useful for treatment of an exhaust gas originating from internal combustion engines, for example gasoline or diesel engines, especially heavy-duty diesel engines.

In a further aspect, the present invention relates to a system for treatment of an exhaust gas, especially originating from an internal combustion engine, which comprises a reductant source, the catalytic system as described herein.

The system for treatment of an exhaust gas may further comprise one or more exhaust gas treatment elements. Conventional exhaust gas treatment elements include, but are not limited to catalyst other than SCR catalyst, such as diesel oxidation catalyst (DOC), three-way conversion catalyst (TWC), four-way conversion catalyst (FWC), non-catalyzed or catalyzed soot filter (CSF), ammonia oxidation catalyst (AMOx), NOx trap, NOx absorber catalyst, hydrocarbon trap catalyst, sensor and mixer.

In a variant of the system for treatment of an exhaust gas, at least one region of the catalytic system is not closely connected to the other region(s). In this case, one or more elements of the exhaust gas treatment system may be arranged intermediately, for example a catalytic component other than SCR catalyst, reductant source, filter, sensor and/or mixer.

It is preferred that the exhaust gas treatment system further comprise a diesel oxidation catalyst located downstream of the engine and upstream of the catalytic system according to the present invention. In some embodiments, the exhaust gas treatment system preferably comprises both a diesel oxidation catalyst and a catalyzed soot filter located upstream of the catalytic system according to the present invention.

EMBODIMENTS

Various embodiments are listed below. It will be understood that the embodiments listed below may be combined with all aspects and other embodiments in accordance with the scope of the invention.

Embodiment 1. A catalyst system for purifying an exhaust gas, comprising
one or more antimony-containing regions comprising an antimony-containing catalyst, particularly antimony-containing SCR catalyst, and
one or more antimony-trapping regions comprising a molecular sieve which is optionally metal-promoted,
wherein at least one of the one or more antimony-trapping regions is located downstream of the one or more antimony-containing regions in a flow direction of the exhaust gas.

Embodiment 2. The catalyst system according to Embodiment 1, wherein the antimony-containing catalyst contains an antimony oxide, a vanadium oxide and optionally at least one oxide of other metal or metalloid, which are supported on particles of a support.

Embodiment 3. The catalyst system according to Embodiment 2, wherein the support in the antimony-containing catalyst is selected from molecular sieves and oxides of an element selected from the group consisting of Ti, Si, W, Al, Ce, Zr, Mg, Ca, Ba, Y, La, Pr, Nb, Mo, Mn, Fe, Co, Ni, Cu, Zn, Ga, Sn and Bi.

Embodiment 4. The catalyst system according to Embodiment 2 or 3, wherein the other metal or metalloid is selected from the group consisting of B, Al, Bi, Si, Sn, Pb, Sb, Cr, Mn, Fe, Co, Ni, Cu, Zn, Ga, Ce, Y, Nb, Mo, Er, Ba, Sm and W.

Embodiment 5. The catalyst system according to any of Embodiments 1 to 4, wherein at least one of the one or more antimony-trapping regions comprises a precious metal based catalyst.

Embodiment 6. The catalyst system according to Embodiment 5, wherein the precious group metal based catalyst contains one or more precious metals, preferably platinum group metals, more preferably Pt, supported on particles of a support.

Embodiment 7. The catalyst system according to Embodiment 6, wherein the support in the precious group metal based catalyst is selected from molecular sieves and oxides of an element selected from the group consisting of Ti, Si, W, Al, Ce, Zr, Mg, Ca, Ba, Y, La, Pr, Nb, Mo, Mn, Fe, Co, Ni, Cu, Zn, Ga, Sn, Sm, Eu, Hf, and Bi.

Embodiment 8. The catalyst system according to any of Embodiments 5 to 7, wherein at least one of the one or more antimony-trapping regions is layered, with a layer comprising the molecular sieve and a layer comprising the precious metal based catalyst.

Embodiment 9. The catalyst system according to any of Embodiments 5 to 8, wherein each of the one or more precious metals is present in an amount of 0.01 to 20 g/ft$^3$, preferably 0.5 to 10 g/ft$^3$, based on each antimony-trapping region.

Embodiment 10. The catalytic system according to any of Embodiments 1 to 9, wherein the molecular sieve in the one or more antimony-trapping regions is selected from aluminosilicate zeolites having a framework type of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG or ZON, and any combinations thereof, among which AEI, BEA, CHA, AFT, AFX, FAU, FER, KFI, MOR, MFI, MOR, MEL or any combinations thereof are preferred.

Embodiment 11. The catalytic system according to any of Embodiments 1 to 10, wherein the molecular sieve is metal-promoted and the metal is selected from precious metals such as Au and Ag, platinum group metals such as Ru, Rh, Pd, In and Pt, base metals such as Cr, Zr, Nb, Mo, Fe, Mn, W, V, Al, Ti, Co, Ni, Cu, Zn, Sb, Sn and Bi, alkali earth metals such as Can and Mg, and any combinations thereof.

Embodiment 12. The catalytic system according to Embodiment 11, wherein the molecular sieve is metal-promoted and the metal is Fe, Cu or a combination thereof.

Embodiment 13. The catalytic system according to any of Embodiments 1 to 12, wherein the molecular sieve in the one or more antimony-trapping regions is selected from aluminosilicate zeolites having a $SiO_2/Al_2O_3$ molar ratio (SAR) in the range of 5:1 to 150:1, preferably 5:1 to 50:1, and particularly 10:1 to 40:1.

Embodiment 14. The catalytic system according to any of Embodiments 1 to 13, wherein the one or more antimony-trapping regions and the one or more antimony-containing regions are, independently from each other, present in form of extrudates or in form of washcoats on substrate.

Embodiment 15. The catalytic system according to any of Embodiments 1 to 14, wherein at least one of the one or more antimony-trapping regions and at least one of the one or more antimony-containing regions are carried on two or more pieces of inert substrate separately.

Embodiment 16. The catalytic system according to Embodiment 14 or 15, wherein the extrudate and/or the substrate have a honeycomb structure, for example monolithic flow-through structure or wall-flow structure.

Embodiment 17. The catalytic system according to any of Embodiments 1 to 16, wherein each of the one or more antimony-containing regions is comprised in the catalytic system in a proportion of 10 to 90% by volume, preferably 20 to 80% by volume, more preferably 30 to 70% % by volume relative to the total volume of the antimony-containing regions and the antimony-trapping regions.

Embodiment 18. The catalytic system according to any of Embodiments 1 to 17, wherein each of the one or more antimony-trapping regions is comprised in the catalytic system in a proportion of 10 to 90% by volume, preferably 20 to 80% by volume, more preferably 30 to 70% by volume relative to the total volume of the antimony-containing regions and the antimony-trapping regions.

Embodiment 19. A method for treatment of an exhaust gas containing nitrogen oxides, which comprises contacting the exhaust gas with the catalytic system as defined in any of Embodiments 1 to 18 in the presence of a reductant.

Embodiment 20. The method according to Embodiment 19, wherein the exhaust gas originates from internal combustion engines, for example gasoline or diesel engines.

Embodiment 21. A system for treatment of an exhaust gas, especially originating from an internal combustion engine, which comprises a reductant source, the catalytic system according to any of Embodiments 1 to 18, and optionally one or more of diesel oxidation catalyst (DOC), three-way conversion catalyst (TWC), four-way conversion catalyst (FWC), non-catalyzed or catalyzed soot filter (CSF), ammonia oxidation catalyst (AMOx), NOx trap, NOx absorber catalyst, hydrocarbon trap catalyst, sensor and mixer.

The invention will be further illustrated by following Examples, which set forth particularly advantageous embodiments. While the Examples are provided to illustrate the present invention, they are not intended to limit it.

EXAMPLES

Example 1

Example 1.1 Preparation of a Piece Comprising an Antimony-Containing Catalyst on Substrate 173.2 g $TiO_2$ in anatase form having a titanium content of 95.9 wt % calculated as $TiO_2$, 74.4 g vanadyl oxalate solution having a vanadium content of 10.75 wt % calculated as $V_2O_5$, and 12.0 g $Sb_2O_3$ were mixed in 200 g DI water at room temperature. After stirring the obtained suspension for 30 minutes, 30% aqueous ammonia solution was further added to raise the system pH to 7.0. Then 46.2 g $SiO_2$ sol having a $SiO_2$ content of 30.1 wt % was added. After stirring for 1 hour, a homogenous slurry was obtained. A flow-through honeycomb cordierite substrate of 300 cpsi with a wall thickness of 5 mils was dipped into the obtained slurry to load enough slurry. Extra loaded slurry was blown off with an air knife carefully, followed by drying with hot air at 150° C. for 15 minutes and then calcining at 450° C. for 1 hour in air.

The process of dipping, drying and calcining was repeated until a total washcoat loading on the substrate of 4.5 $g/in^3$ was obtained. The antimony-containing catalyst has a vanadium content of 4.0 wt %, calculated as $V_2O_5$.

Example 1.2 Preparation of an Antimony-Trapping Piece Comprising a Top Layer of Cu Promoted CHA Zeolite and a Bottom Layer of Pt Based Catalyst on Substrate i) Preparation of Bottom Layer A solution of bis(ethanolammonium)hexahydroxoplatinum(IV) having a Pt content of 17.6 wt % was mixed with deionized water to form a uniform mixture, which was impregnated to 510 g $Al_2O_3$ powder and stirred for 30 min. The obtained slurry was coated onto a flow-through cordierite monolith substrate of 300 cpsi with a wall thickness of 5 mils by dipping the substrate into the slurry. Extra loaded slurry was blown off with an air knife carefully, followed by drying at 130° C. and calcination at 450° C. After cooling to room temperature, the process of dipping, drying and calcining was repeated until a total washcoat loading on the substrate of 0.5 $g/in^3$ was obtained, with the Pt loading is 2 $g/ft^3$.

ii) Preparation of Top Layer

A H-formed CHA zeolite was used, which has a $SiO_2$ to $Al_2O_3$ molar ratio of 31, BET surface area more than 600 $m^2/g$, Do of 16 μm, $Na_2O_{<=0.07}$ wt % and tapped density of 0.37 g/mL.

92 parts by weight of the CHA zeolite, 3 parts by weight of copper oxide (CuO) and 5 parts by weight of zirconium acetate calculated as $ZrO_2$ were mixed into deionized water to form a slurry. The slurry was then milled to a particle size of $D_{90}$ of 5 μm, as measured with a Sympatec particle size analyser. The milled slurry was coated onto the coated substrate from above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 $g/in^3$ was obtained.

Example 2

Example 2.1 Preparation of a Piece Comprising an Antimony-Containing Catalyst on Substrate The piece was prepared by the same process as described in Example 1.1

Example 2.2 Preparation of an Antimony-Trapping Piece Comprising a Top Layer of Cu Promoted CHA Zeolite and a Bottom Layer of Pt Based Catalyst on Substrate i) Preparation of Bottom Layer The bottom layer of the antimony-trapping piece was prepared by the same process as described in Example 1.

ii) Preparation of Top Layer

A H-formed CHA zeolite was used, which has a $SiO_2$ to $Al_2O_3$ molar ratio of 11, BET surface area of 450 $m^2/g$, Do of 13 μm, $Na_2O<=0.12$ wt % and tapped density of 0.6 g/mL.

91 parts by weight of the CHA zeolite, 4 parts by weight of copper oxide (CuO) and 5 parts by weight of zirconium acetate calculated as $ZrO_2$ were mixed into deionized water to form a slurry. The slurry was then milled to a particle size of $D_{90}$ of 5 μm, as measured with a Sympatec particle size analyser. The milled slurry was coated onto the coated substrate obtained above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 g/in³ was obtained.

Example 3

Example 3.1 Preparation of a Piece Comprising an Antimony-Containing Catalyst on Substrate The piece was prepared by the same process as described in Example 1.1

Example 3.2 Preparation of a Piece Comprising a Top Layer of Cu Promoted CHA Zeolite and a Bottom Layer of Pt Based Catalyst on Substrate i) Preparation of Bottom Layer The bottom layer of the antimony-trapping piece was prepared by the same process as described in Example 1.

ii) Preparation of Top Layer

A H-formed CHA zeolite was used, which has a $SiO_2$ to $Al_2O_3$ molar ratio of 11, BET surface area of 450 m²/g, $D_{90}$ of 13 μm, $Na_2O_{<=0.12}$ wt % and tapped density of 0.6 g/mL.

87 parts by weight of the CHA zeolite, 8 parts by weight of copper oxide (CuO) and 5 parts by weight of zirconium acetate calculated as $ZrO_2$ were mixed into deionized water to form a slurry. The slurry was then milled to a particle size of $D_{90}$ of 5 μm, as measured with a Sympatec particle size analyser. The milled slurry was coated onto the coated substrate obtained above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 g/in³ was obtained.

Example 4

Example 4.1 Preparation of a Piece Comprising an Antimony-Containing Catalyst on Substrate The piece was prepared by the same process as described in Example 1.1

Example 4.2 Preparation of a Piece Comprising a Top Layer of Fe Promoted Beta Zeolite and a Bottom Layer of Pt Based Catalyst on Substrate i) Preparation of Bottom Layer The bottom layer of the antimony-trapping piece was prepared by the same process as described in Example 1.

ii) Preparation of Top Layer

A Fe/Beta zeolite was used, which has a $SiO_2$ to $Al_2O_3$ molar ratio of 40, iron loading of 1.4 wt % calculated as $Fe_2O_3$, X-ray crystallinity of 100%, BET surface area of 708 m²/g, $D_{90}$=5 microns, and $Na_2O_{=0.03}$ wt %.

95 parts by weight of the Fe/Beta zeolite and 5 parts by weight of zirconium acetate calculated as $ZrO_2$ were mixed into deionized water to form a slurry. The slurry was then milled to a particle size of $D_{90}$ of 5 μm, as measured with a Sympatec particle size analyser. The milled slurry was coated onto the coated substrate obtained above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 g/in³ was obtained.

Example 5

Example 5.1 Preparation of a Piece Comprising an Antimony-Containing Catalyst on Substrate The piece was prepared by the same process as described in Example 1.1

Example 5.2 Preparation of a Piece Comprising a Top Layer of Fe Promoted Beta Zeolite and a Bottom Layer of Pt Based Catalyst on Substrate i) Preparation of Bottom Layer The bottom layer of the antimony-trapping piece was prepared by the same process as described in Example 1.

ii) Preparation of Top Layer

A Fe/Beta zeolite was used, which has a $SiO_2$ to $Al_2O_3$ molar ratio of 40, iron loading of 1.4 wt % calculated as $Fe_2O_3$, X-ray crystallinity of 100%, BET surface area of 708 m²/g, $D_{90}$=5 microns, and $Na_2O$=0.03 wt %.

94 parts by weight of the Fe/Beta zeolite, 1 part by weight of iron nitrate calculated as $Fe_2O_3$ and 5 parts by weight of zirconium acetate calculated as $ZrO_2$ were mixed into deionized water to form a slurry. The slurry was then milled to a particle size of Do of 5 μm, as measured with a Sympatec particle size analyser. The milled slurry was coated onto the coated substrate obtained above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 g/in³ was obtained.

Example 6

Example 6.1 Preparation of a Piece Comprising an Antimony-Containing Catalyst on Substrate The piece was prepared by the same process as described in Example 1.1

Example 6.2 Preparation of a Piece Comprising a Top Layer of Fe Promoted Beta Zeolite and a Bottom Layer of Pt Based Catalyst on Substrate i) Preparation of Bottom Layer The bottom layer of the antimony-trapping piece was prepared by the same process as described in Example 1.

ii) Preparation of Top Layer

A Fe/Beta zeolite was used, which has a $SiO_2$ to $Al_2O_3$ molar ratio of 9, an iron loading of 4.8 wt % calculated as $Fe_2O_3$, X-ray crystallinity of 98%, BET surface area of 578 m²/g, $D_{90}$=13 μm, $Na_2O$ of 0.07 wt %, $K_2O$ of 0.03 wt %, CaO of 0.01 wt %, MgO of 0.02 wt %.

95 parts by weight of the Fe/Beta zeolite and 5 parts by weight of zirconium acetate calculated as $ZrO_2$ were mixed into deionized water to form a slurry. The slurry was then milled to a particle size of $D_{90}$ of 5 μm, as measured with a Sympatec particle size analyser. The milled slurry was coated onto the coated substrate obtained above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 g/in³ was obtained.

Example 7

Example 7.1 Preparation of a Piece Comprising an Antimony-Containing Catalyst on Substrate The brick was prepared by the same process as described in Example 1.1

Example 7.2 Preparation of a Piece Comprising a Top Layer of Fe Promoted Beta Zeolite and a Bottom Layer of Pt Based Catalyst on Substrate i) Preparation of Bottom Layer The bottom layer of the antimony-trapping piece was prepared by the same process as described in Example 1.

ii) Preparation of Top Layer

A H-formed Beta zeolite was used, which has a $SiO_2$ to $Al_2O_3$ molar ratio of 150, X-ray crystallinity of 90%, BET surface area of 568 m$^2$/g, $D_{90}$=15 μm, loose bulk density of 0.3 g/L.

91 parts by weight of the Beta zeolite, 4 part by weight of iron nitrate calculated as $Fe_2O_3$ and 5 parts by weight of zirconium acetate calculated as $ZrO_2$ were mixed into deionized water to form a slurry. The slurry was then milled to a particle size of $D_{90}$ of 5 μm, as measured with a Sympatec particle size analyser. The milled slurry was coated onto the coated substrate obtained above step i) by dipping the substrate into the slurry. Extra loaded slurry was blown off with an air knife carefully, followed by drying at 130° C. and calcination at 550° C. The process of dipping, drying and calcining was repeated until a total washcoat loading on the substrate of 2.1 g/in$^3$ was obtained.

Example 8 Measurement of Sb Release

Preparation of Test Samples

Samples representing the antimony-containing region were prepared by cutting cores having a diameter of 1 inch and a length of 2 inches from each piece comprising an antimony-containing catalyst as prepared in above Examples.

Samples representing the antimony-trapping region were prepared by cutting cores having a diameter of 1 inch and a length of 1 inch from each antimony-trapping piece as prepared in above Examples.

Measurement Process

In a laboratory fixed-bed simulator (quartz glass tube having an inside diameter of 1.2 inch), one sample representing the antimony-containing region, one sample of the antimony-trapping region were installed successively from upstream to downstream in the flow direction of gas, using ceramic fiber paper as the matting material wrapping around the samples. 8 g gamma-alumina granules (Alfa Aesar, bimodal) was filled after the samples as an adsorber. After installation, the simulator was purged with a gas of $N_2$ having 5 vol % of 02 and heated up to the temperature as shown in Table 1. Then, a gas consisting of 5 vol % $H_2O$, 5 vol % $O_2$, 500 vppm NO, 500 vppm $NH_3$ and the balance of $N_2$ was fed into the simulator for 18 hours at a total flow rate of 7.5 L/min for thermal treatment.

For comparison, a test wherein the sample representing the antimony-trapping region was replaced with gamma-alumina granules was also conducted.

After cooling, the gamma-alumina granules were removed from the reactor and analyzed for the antimony content in accordance with following procedure, which indicates the release of antimony from the preceding samples:

i) Grinding the gamma-alumina granules to fine powder;
ii) Dissolving the powder from i) in mineral acids consisting of 12 parts by volume of 16 N $HNO_3$, 4.0 parts by volume of 28 N HF and 0.8 parts by volume of 12 N HCl by pressure digestion until a clear solution was observed; and
iii) Determining the antimony content with Inductively Coupled Plasma-Optical Emission Spectrometry (ICP-OES).

The test results are summarized in Table 1 below.

TABLE 1

| Samples | Designs upstream | Designs downstream | Thermal treatment | Elemental antimony content in gamma-alumina, ppm |
|---|---|---|---|---|
| Example 1 | Example 1.1 | Example 1.2 | 650° C., 18 hrs | 0.2 |
| Example 2 | Example 2.1 | Example 2.2 | 650° C., 18 hrs | 0.5 |
| Example 3 | Example 3.1 | Example 3.2 | 650° C., 18 hrs | 0.8 |
| Example 4 | Example 4.1 | Example 4.2 | 650° C., 18 hrs | 0.5 |
| Example 5 | Example 5.1 | Example 5.2 | 650° C., 18 hrs | 0.4 |
| Example 6 | Example 6.1 | Example 6.2 | 750° C., 18 hrs | 0.3 |
| Example 7 | Example 7.1 | Example 7.2 | 750° C., 18 hrs | 0.7 |
| Comparative Example 1 | Example 1.1 | none | 650° C., 18 hrs | 2.9 |
| Blank | gamma-alumina granules | | | 0.2 |

Example 9 Catalyst Performance Test

A cylindrical sample having a diameter of 1 inch and a length of 2 inches from Example 1.1 was hydrothermally aged in 10 vol % water/air at 550° C. for 200 hours.

A cylindrical sample having a diameter of 1 inch and a length of 1 inch from Example 1.2 was hydrothermally aged in 10 vol % water/air at 650° C. for 50 hours.

In a laboratory fixed-bed simulator, the aged sample from Example 1.1 was placed upstream and followed by the aged sample from Example 1.2 for measuring SCR catalyst performance. The base feed gas consists of, by volume, 5% $H_2O$, 10% $O_2$, 1000 ppm NO and the balance of $N_2$. The volume-based space velocity (SV) was fixed at 60,000/hr based on 1"×3" cylindrical samples, and the ratio of $NH_3$ to NO (NSR) was fixed at 1.0. The NO conversion at 200° C. was 67%.

The invention claimed is:

1. A catalyst system for purifying an exhaust gas, the catalyst system comprising
   one or more antimony-containing regions comprising an antimony-containing catalyst, and
   one or more antimony-trapping regions comprising a metal-promoted molecular sieve,
   wherein at least one of the one or more antimony-trapping regions is located downstream of the one or more antimony-containing regions in a flow direction of the exhaust gas; and
   wherein the one or more antimony-trapping regions are formed by coating a slurry that has particle size $D_{90}$ of 5 μm and contains the metal-promoted molecular sieve onto a substrate.

2. The catalyst system according to claim 1, wherein the antimony-containing catalyst contains an antimony oxide, a vanadium oxide and at least one oxide of other metal or metalloid, which are supported on particles of a support.

3. The catalyst system according to claim 2, wherein the support in the antimony-containing catalyst is selected from molecular sieves and oxides of an element selected from the group consisting of Ti, Si, W, Al, Ce, Zr, Mg, Ca, Ba, Y, La, Pr, Nb, Mo, Mn, Fe, Co, Ni, Cu, Zn, Ga, Sn and Bi.

4. The catalyst system according to claim 2, wherein the other metal or metalloid is selected from the group consisting of B, Al, Bi, Si, Sn, Pb, Sb, Cr, Mn, Fe, Co, Ni, Cu, Zn, Ga, Ce, Y, Nb, Mo, Er, Ba, Sm and W.

5. The catalyst system according to claim 1, wherein at least one of the one or more antimony-trapping regions comprises a precious group metal based catalyst.

6. The catalyst system according to claim 5, wherein the precious group metal based catalyst contains one or more precious metals supported on particles of a support, the one or more precious metals including platinum group metals.

7. The catalyst system according to claim 6, wherein the support in the precious group metal based catalyst is selected from molecular sieves and oxides of an element selected from the group consisting of Ti, Si, W, Al, Ce, Zr, Mg, Ca, Ba, Y, La, Pr, Nb, Mo, Mn, Fe, Co, Ni, Cu, Zn, Ga, Sn, Sm, Eu, Hf, and Bi.

8. The catalyst system according to claim 6, wherein each of the one or more precious metals is present in an amount of 0.01 to 20 g/ft$^3$, based on each antimony-trapping region.

9. The catalyst system according to claim 5, wherein the at least one of the one or more antimony-trapping regions is layered, with a layer comprising the metal-promoted molecular sieve and a layer comprising the precious metal based catalyst.

10. The catalyst system according to claim 1, wherein the metal-promoted molecular sieve is selected from aluminosilicate zeolites including a framework type of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA,-CHI,-CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR,-IFU, IFW, IFY, IHW, IMF, IRN, IRR,-IRY, ISV, ITE, ITG, ITH, *-ITN, ITR, ITT,-ITV, ITW, IWR, IWS, IWV, IWW, JBW, JNT, JOZ, JRY, JSN, JSR, JST, JSW, KFI, LAU, LEV, LIO,-LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE,-PAR, PAU, PCR, PHI, PON, POS, PSI, PUN, RHO,-RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW,-SVR, SVV, SZR, TER, THO, TOL, TON, TSC, TUN, UEI, UFI, UOS, UOV, UOZ, USI, UTL, UWY, VET, VFI, VNI, VSV, WEI,-WEN, YUG or ZON, and any combinations thereof, or
wherein the molecular sieve is selected from aluminosilicate zeolites including a framework type of AEI, BEA, CHA, AFT, AFX, FAU, FER, KFI, MOR, MFI, MOR, MEL or any combinations thereof.

11. The catalyst system according to claim 1, wherein the metal-promoted molecular sieve is promoted by a metal selected from Au, Ag, Ru, Rh, Pd, In, Pt, Cr, Zr, Nb, Mo, Fe, Mn, W, V, Al, Ti, Co, Ni, Cu, Zn, Sb, Sn, Bi, Ca, and Mg, and any combinations thereof.

12. The catalyst system according to claim 11, wherein the metal is Fe, Cu or a combination thereof.

13. The catalyst system according to claim 1, wherein the metal-promoted molecular sieve is selected from aluminosilicate zeolites including a $SiO_2/Al_2O_3$ molar ratio (SAR) in a range of 5:1 to 150:1.

14. The catalyst system according to claim 1, wherein the one or more antimony-trapping regions and the one or more antimony-containing regions are, independently from each other, of extrudates or washcoats on one or more substrates.

15. The catalyst I system according to claim 14, wherein the extrudates and/or the one or more substrates include a honeycomb structure formed as a monolithic flow-through structure or wall-flow structure.

16. The catalyst system according to claim 1, wherein at least one of the one or more antimony-trapping regions and at least one of the one or more antimony-containing regions are carried separately on two or more pieces of inert substrates.

17. The catalyst system according to claim 1, wherein each of the one or more antimony-containing regions is comprised in a proportion of 10 to 90% by volume relative to a total volume of the one or more antimony-containing regions and the one or more antimony-trapping regions.

18. The catalyst system according to claim 1, wherein each of the one or more antimony-trapping regions is comprised in a proportion of 10 to 90% by volume relative to a total volume of the one or more antimony-containing regions and the one or more antimony-trapping regions.

19. A method for treatment of an exhaust gas containing nitrogen oxides, the method comprising:
treating the exhaust gas from a gasoline or diesel engine with the catalyst system of claim 1 and a reductant.

20. A system for treatment of an exhaust gas, originating from an internal combustion engine, the system comprising:
the catalyst system according to claim 1,
a reductant source, and
one or more of a diesel oxidation catalyst (DOC), a three-way conversion catalyst (TWC), a four-way conversion catalyst (FWC), a non-catalyzed or catalyzed soot filter (CSF), an ammonia oxidation catalyst (AMOx), a NOx trap, a NOx absorber catalyst, a hydrocarbon trap catalyst, a sensor and a mixer.

* * * * *